United States Patent [19]

Batheja et al.

[11] Patent Number: 5,414,743
[45] Date of Patent: May 9, 1995

[54] SECONDARY-SIDE RESIDUAL-HEAT REMOVAL SYSTEM FOR PRESSURIZED-WATER NUCLEAR REACTORS

[75] Inventors: Pramod Batheja, Erlangen; Otto Gremm, Spardorf; Werner Leidemann, Obermichelbach; Jürgen Wirkner, Erlangen, all of Germany

[73] Assignee: Siemens Aktiengesellschaft, Munich, Germany

[21] Appl. No.: 195,630

[22] Filed: Feb. 14, 1994

[30] Foreign Application Priority Data

Aug. 12, 1991 [DE] Germany .................. 41 26 630.7

[51] Int. Cl.⁶ .............................................. G21C 15/18
[52] U.S. Cl. ........................................ 376/299; 376/277
[58] Field of Search ............... 376/299, 298, 283, 282, 376/277

[56] References Cited

U.S. PATENT DOCUMENTS

| | | | |
|---|---|---|---|
| 4,206,783 | 6/1980 | Brombach | 137/810 |
| 4,765,946 | 8/1988 | Dagard et al. | 376/299 |

FOREIGN PATENT DOCUMENTS

| | | |
|---|---|---|
| 1326717 | 2/1994 | Canada . |
| 0004167 | 9/1979 | European Pat. Off. . |
| 0362596 | 4/1990 | European Pat. Off. . |
| 2584228 | 1/1987 | France . |
| 2712443 | 9/1978 | Germany . |
| 2712444 | 9/1978 | Germany . |
| 2459150 | 7/1980 | Germany . |
| 3212215 | 3/1983 | Germany . |
| 3622062 | 3/1987 | Germany . |
| 2104710 | 3/1983 | United Kingdom . |
| 910067 | 11/1982 | U.S.S.R. . |
| 971015 | 6/1984 | U.S.S.R. . |

OTHER PUBLICATIONS

Nuclear Eng. Int. Publ. No. 33, Apr. 9, 1991, pp. 49–51, "CAREM aims to make very–low–power reactors . . .".

Primary Examiner—Daniel D. Wasil
Attorney, Agent, or Firm—Herbert L. Lerner; Laurence A. Greenberg

[57] ABSTRACT

A secondary-side residual-heat removal system for a pressurized-water reactor removes residual heat through a secondary side of a steam generator in certain modes of operation and malfunction. For this purpose, the respective steam generator has a connection on a live-steam and feed-water side to a secondary side of a safety condenser. The connection on the feed-water side is led to a supply connection of a swirl or vortex chamber valve having a control connection which is connected to a feed-water line part on the pressure side, with a downgradient from a main feed-water pump, and the swirl or vortex chamber valve has an outlet which opens out into a feed-water inflow space of the steam generator. A tertiary side of the safety condenser is fed from a water reservoir disposed at a geodetically higher level. The steam being generated is discharged into the atmosphere through a blowing-off line, with a separating device if appropriate. Due to the geodetically higher configuration of the safety condenser in comparison with the steam generator, the energy transmission on the secondary side takes place by natural circulation.

6 Claims, 3 Drawing Sheets

SECONDARY-SIDE RESIDUAL-HEAT REMOVAL SYSTEM FOR PRESSURIZED-WATER NUCLEAR REACTORS

Cross-Reference to Related Application

This application is a Continuation of International Application PCT/DE92/00665, filed Aug. 11, 1992.

BACKGROUND OF THE INVENTION

Field of the Invention

The invention relates to a secondary-side residual-heat removal system for a pressurized-water nuclear reactor, including a steam generator being connected into a primary loop of the nuclear reactor by the primary side of its heat-exchanging tubes, and a safety condenser having one side to which a secondary side of the steam generator is connected through circuit lines, with another (tertiary) side of the safety condenser allowing a throughflow of a tertiary medium for the cooling of its secondary side, and the safety condenser being situated at a higher level than the steam generator, defining a difference in level between the safety condenser and the steam generator being dimensioned for achieving a natural circulation in a secondary circuit leading through the secondary side of the steam generator and the safety condenser in a residual-heat removal operation.

After shutting down nuclear reactors, so-called residual heat, which is also referred to as decay heat, occurs in all modes of operation and malfunction. In the case of pressurized-water nuclear reactors, the secondary side is used, at least in an initial phase, for the removal of the residual heat, in virtually all modes of operation and malfunction. That takes place by feeding the steam generators with feed-water and by discharging energy transferred in the heat generator from its primary side to its secondary side through its tube bundle, directly or indirectly into the atmosphere.

In order to keep malfunctions under control, a previously known concept for secondary-side residual-heat removal in the installations of pressurized-water nuclear reactors provides an emergency feeding system on the secondary-side feeding side of the steam generators and a steam blow-off device with blow-control and a safety valve on the discharge side. Such a system is disclosed, for example, by German Published, Prosecuted Application DE-AS 24 59 150 (1) or by Published European Application No. 0 004 167 A3 (2). In publication (1) it is shown that the respective heat generator is connected by its secondary side not only to its operational feed-water and live-steam lines but also through emergency cooling circuit lines with a condensate recirculation pump to one side of a safety condenser. That safety condenser, which is referred to therein as a residual-heat removal heat exchanger and is equipped with additional condensate cooling means, may be replaced, if appropriate, by a water pool basin. Such a basin is shown in publication (2) and it serves for the blowing off of the secondary-side steam to be cooled, with the water pool being cooled by heat-exchanging tubes which are connected to a cooling circuit. The secondary-side steam is cooled and condensed by the blowing off into the water pool. The condensate is recirculated by means of a condensate recirculation pump to the secondary side of the steam generator, i.e. to its feed-water space. In the case of publication (1) and publication (2), residual-heat removal operation is initiated by the opening of conventional shut-off valves (reducing valves, shut-off valves).

SUMMARY OF THE INVENTION

It is accordingly an object of the invention to provide a secondary-side residual-heat removal system for pressurized-water nuclear reactors, which overcomes the hereinafore-mentioned disadvantages of the heretofore-known devices of this general type and which provides for supplying a safety condenser (SACO) on its tertiary side and a secondary-side SACO circuit in such a way that switching on pumps and/or opening conventional shut-off valves is not required for putting the residual-heat removal by the safety condenser into operation, whereby the inherent safety of the residual-heat removal system can be increased.

With the foregoing and other objects in view there is provided, in accordance with the invention, a secondary-side residual-heat removal system in a pressurized-water nuclear reactor having a primary loop, comprising a steam generator having a primary side, a secondary side, heat-exchanging tubes with a primary side being connected into the primary loop of the nuclear reactor, a feed-water connection on the secondary side, a main feed-water pump connected to the steam generator; a safety condenser, circuit lines having a cold leg leading from the safety condenser to the feed-water connection of the steam generator, the safety condenser having a secondary side connected to the secondary side of the steam generator by the circuit lines in a secondary circuit and having a tertiary side allowing a throughflow of a tertiary medium for cooling the secondary side of the safety condenser, the safety condenser being disposed at a higher level than the steam generator, defining a difference in level between the safety condenser and the steam generator being dimensioned for achieving a natural circulation in the secondary circuit leading through the secondary side of the steam generator and the safety condenser in a residual-heat removal operation; a vortex chamber valve having a supply connection, an outlet, a control connection and an internal flow path leading from the supply connection to the outlet and into the cold leg of the circuit lines, the control connection shutting off the internal flow path with a secondary-side control pressure to be picked or tapped off in normal operation of the steam generator, but releasing the control path in residual-heat removal operation, when the control pressure drops or disappears, for freely switching on the vortex chamber valve due to a reduced control pressure at the control connection and setting a circulating flow in motion in the secondary circuit through the vortex chamber valve, when the main feed-water pump is switched off; and a water reservoir being disposed at a geodetically higher level than the safety condenser for supplying the tertiary side of the safety condenser, with a minimum flow bypass line being connected to the water reservoir and the safety condenser having a tertiary-side intake being connected to the minimum flow bypass line, or with the safety condenser having a heat-exchanging tube bundle and the water reservoir having a water pool surrounding the heat-exchanging tube bundle of the safety condenser.

The natural circulation may also be set in motion by switching off other pumps, for example start-up and shut-down pumps.

In order to provide for the natural circulation, it is sufficient for the distance between the two water-column levels of the safety condenser (for example a condensate collector) and the steam generator to be on the order of magnitude of about 2 m.

The tertiary medium evaporating in the safety condenser is expediently blown out over the roof through a blowing-off line.

In accordance with another feature of the invention, the safety condenser has a tertiary-side intake, and there is provided a parallel connection connecting the water reservoir to the tertiary-side intake, the parallel connection having one branch with a minimum flow bypass line and a shut-off valve and another branch with a control valve.

In accordance with a further feature of the invention, there is provided a pressure-side feed-water line part having a downgradient from the main feed-water pump and being connected to the control connection of the vortex chamber valve.

In accordance with a concomitant feature of the invention, the water reservoir has a water pool, the safety condenser has a heat-exchanging tube bundle disposed in the water pool, forming a combined safety condenser/water reservoir, the steam generator has a secondary chamber, and including a control valve being open in normal operation of the steam generator, the outlet of the vortex chamber valve opening out into the secondary chamber through the control valve.

It is also possible in principle for the control valve to be disposed between the safety condenser and the swirl chamber valve. Thus, in operation as intended (normal operation), the valve is open and does not have to be actuated until controlling the capacity of the safety condenser.

The advantages which can be achieved with the invention are primarily to be regarded as that the passive characteristics of the residual-heat removal system are improved. The natural circulation is induced automatically/passively without active actuation of valves. The supply of the (tertiary) cooling medium to the safety condenser takes place without pumps. The actuation of a control valve is not required until controlling the cooling capacity or rate of flow when the natural circulation has established itself.

Other features which are considered as characteristic for the invention are set forth in the appended claims.

Although the invention is illustrated and described herein as embodied in a secondary-side residual-heat removal system for pressurized-water nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
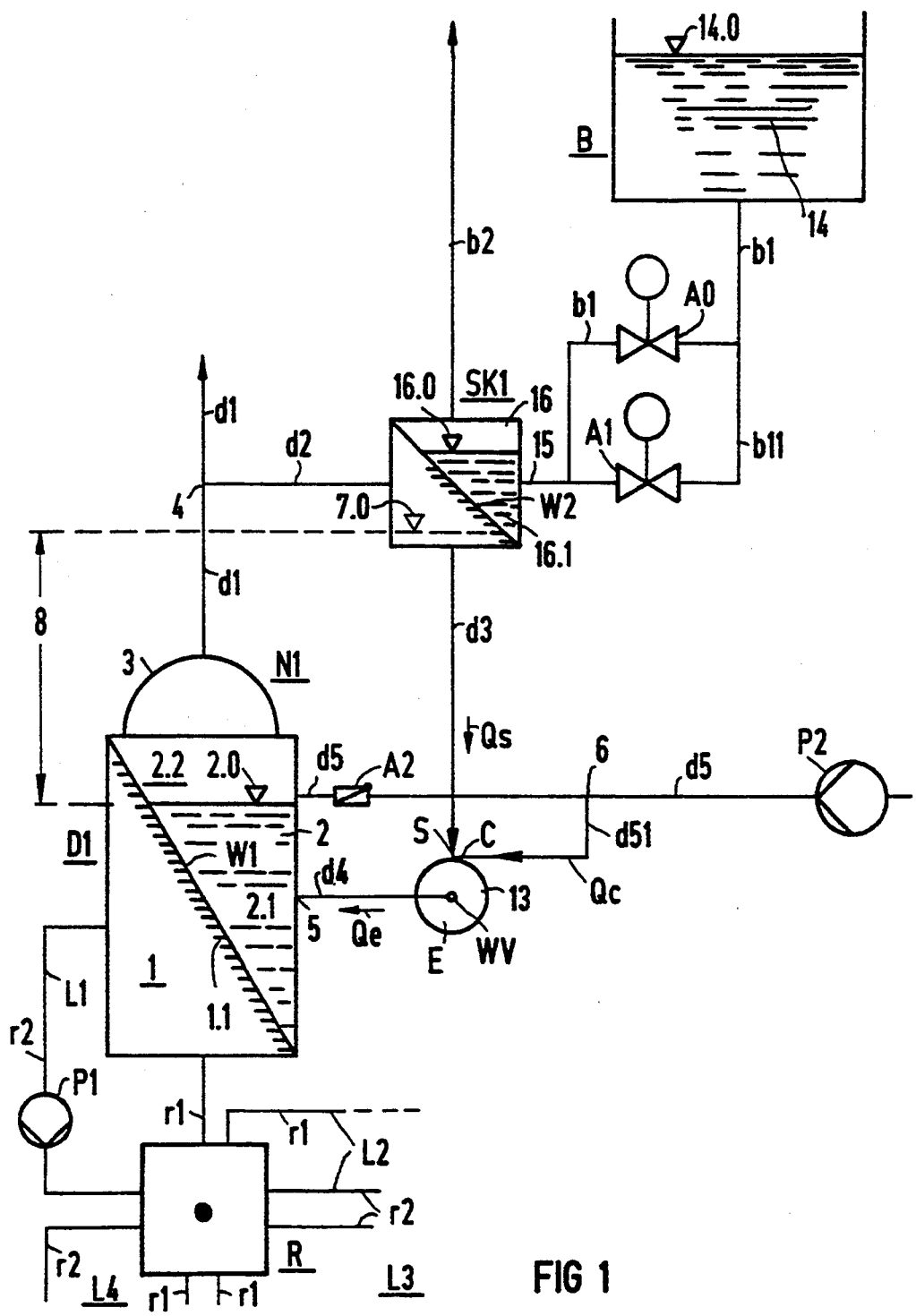
FIG. 1 is a diagrammatic and schematic view showing a residual-heat removal system in a detail including major components and pipelines with a steam generator, which belongs to a non-illustrated pressurized-water nuclear power plant, a safety condenser and a water reservoir (demineralized water tank)

Referring now to the figures of the drawing in detail and first, particularly, to FIG. 1 thereof, there is seen a residual-heat removal system which belongs, for example, to a pressurized-water nuclear reactor with a four-loop primary circuit configuration. In this case a reactor R is assigned to four primary-circuit loops (primary loops), which are denoted by reference symbols L1 to L4. The loops are represented fully only in the case of the primary loop L1, but in each case they have a steam generator D1 and a main coolant pump P1. Of course, the invention can also be applied in the case of three-loop or two-loop installations. All of the primary loops L1 to L4 are identically constructed. In the case of the primary loop L1 which is represented in greater detail, a hot leg r1 leads from the reactor R to a primary chamber 1 of the steam generator D1. The steam generator D1 has a tube bundle which is denoted by reference symbol W1 and a secondary chamber which is denoted by reference symbol 2. Re-cooled primary medium is fed back from the primary chamber 1 through a cold leg r2 and the main coolant pump P1 into the nuclear reactor R through a non-illustrated inlet nozzle of the latter. Primary medium 1.1 circulates through a tube bundle W1 and fills the latter (which is diagrammatically indicated by horizontal dashes at a diagonal line symbolizing the tube bundle W1). The pressure on the primary side is, for example, 155 bar and on the secondary side is, for example, 64 bar. A level of a secondary medium 2.1 in the secondary chamber 2 is denoted by reference symbol 2.0. Above the level 2.0 there is a steam space 2.2, in which non-illustrated steam moisture separators or steam driers are disposed. The live steam generated passes through a steam dome 3 into a live-steam line d1 and from there through a non-illustrated live-steam valve to a non-illustrated steam turbine and further components and pipelines of a secondary-side thermal cycle of the nuclear power plant.

The steam generator D1 (and accordingly also the non-illustrated steam generators of the other loops L2 to L4) is connected to its operational live-steam line d1 and a feed-water line d5, through the circuit line d1 (up to a branching point 4), through a circuit line d2 (these two line parts d1, d2 form the hot leg) and through line parts d3, d4 of the circuit lines forming the cold leg. The steam generator D1 is also connected to one side of a safety condenser SK1, which has a tube bundle W2 that is diagrammatically indicated by a diagonal line (in just the same way as in the case of the steam generator D1). The circuit lines d1 to d4, which connect the secondary sides of the steam generator D1 and of the safety condenser SK1 to each other, are referred to below as SACO circuit lines, and the safety condenser itself is referred to as SACO (which is an abbreviation for safety condenser). Through the use of the feed-water line d5, the feed-water is delivered from a main feed pump P2 through a non-return valve A2 into the secondary chamber 2. The SACO SK1 is set up on its other (tertiary) side for cooling the secondary medium circulating in the SACO circuit d1–d4 (this secondary circuit is denoted as a whole by reference symbol N1) by supplying a cooling medium (demineralized water), which is still to be explained in further detail below.

According to the invention, the lines d3–d4 of the cold leg of the SACO circuit N1 or the SACO circuit lines d1–d4 leading from the SACO SK1 to a feed-water connection 5 of the lower-situated steam generator D1, are led by its line part d3 to a supply connection S of a swirl chamber valve WV. The swirl chamber valve WV has a control connection C which is connected by a pressure-side feed-water line part d51 to a downgradient of the main feed-water pump P2 and is connected through the line part d51 to the feed-water line d5 at a connection point 6. An outlet E of the swirl chamber valve WV opens out through the line part d4 into the secondary chamber 2 in the region of the connection point 5, i.e. into its inflow space filled by the feed-water 2.1. The difference in level between the SACO SK1 and the steam generator D1, i.e. in particular the difference in level between a level 7.0 and the level 2.0 of the feed-water 2.1 in the secondary chamber 2, is dimensioned in such a way that a natural circulation through the SACO circuit N1 or its corresponding circuit lines d1–d4 can be accomplished during residual-heat removal operation. This difference in level is diagrammatically indicated by dashed level lines and an arrow 8 representing the distance between the levels. In order to provide for the natural circulation, a level distance 8 on the order of magnitude of about 2 m is sufficient.

Figure 3:
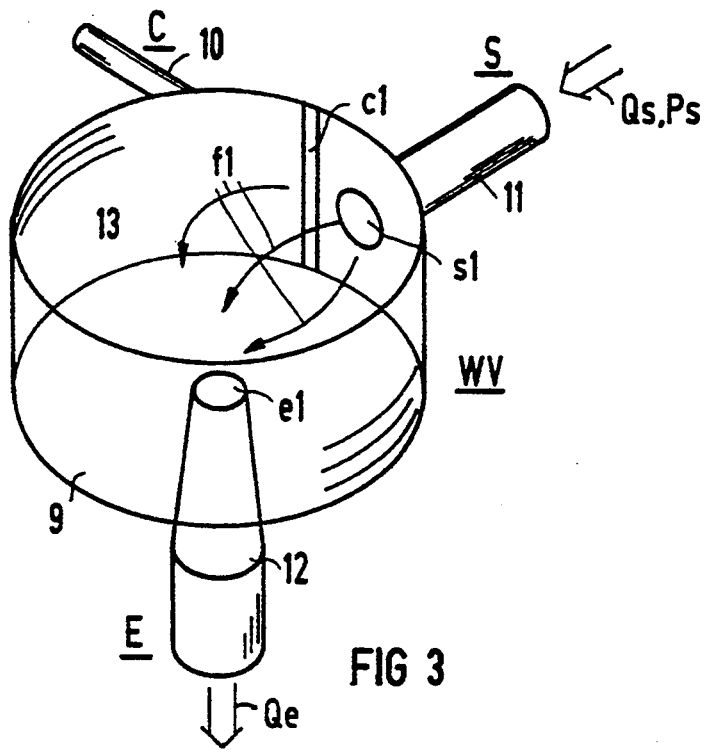
FIG. 3 is a diagrammatic, perspective, transparent representation of a single swirl chamber valve, in which a control connection is not actuated and therefore a largely unthrottled flow connection exists between a supply connection and an outlet.
Figure 4:
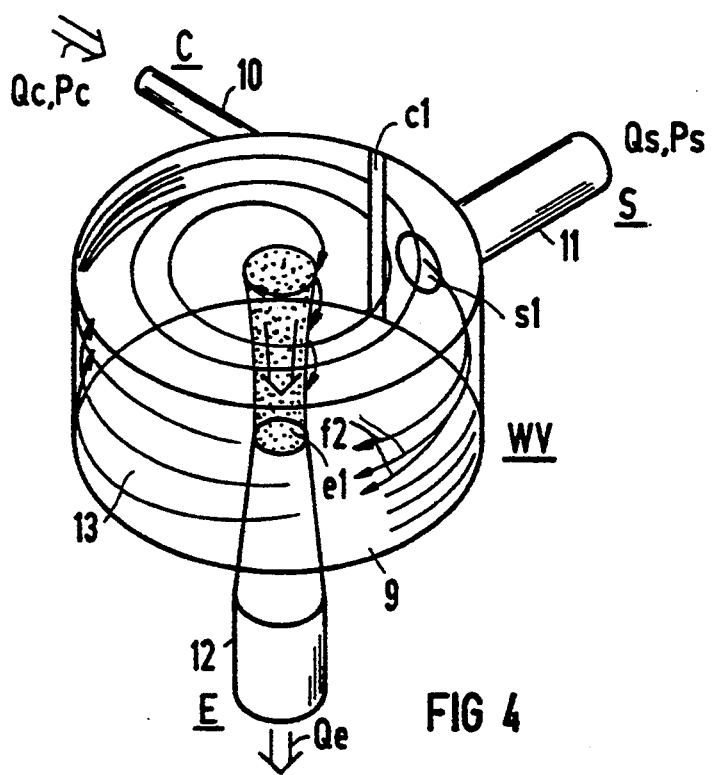
FIG. 4 is a view similar to FIG. 3 of a swirl chamber valve in which a tangentially entering control connection is actuated and therefore a control pressure counteracting the supply pressure is generated, with the control pressure significantly increasing throughflow resistance from the supply line to the outlet.

FIGS. 3 and 4 show that the swirl chamber valve WV, which may also be referred to as a vortex chamber valve, includes a flat hollow-cylindrical housing 9 with three openings c1, s1 and e1 and with a tangential connection nozzle 10, a radial connection nozzle 11 and an axial connection nozzle 12 respectively connected thereto. The tangential control connection C, the radial supply connection S and the axial outlet E are respectively formed by the openings with nozzles c1/10, s1/11 and e1/12. A supply stream Qs fed through the radial opening s1 is not disturbed when there is no control stream Qc or only a small control stream Qc and leaves a swirl chamber 13 through the axially disposed outlet E or the outlet nozzle 12 as an outlet stream Qe, which is indicated by an arrow f1 in FIG. 3. With the aid of a tangential control stream Qc conducted through the opening c1 as is seen in FIG. 4, a swirl flow is generated in the swirl chamber 13, as arrows f2 symbolize. The centrifugal force has the effect of building up a counter pressure in the swirl chamber 13, whereby the inflow of the supply flow Qs comes to a standstill. In this case, a control pressure Pc must be slightly higher (by about 5 to 10%) than the supply pressure Ps. In this state, all that flows is the control stream Qc, which makes up about 5 to 10% of the required supply stream Qs through the swirl chamber 13. A higher control stream Qc would also not have any adverse effects.

Following the functional explanation of the swirl chamber valve WV with reference to FIGS. 3 and 4, it can now be recognized from FIG. 1 that when the main feed-water pump P2 is switched off, the swirl chamber valve WV is set in motion due to the reduced control pressure Pc, or the control stream Qc, at the control connection C of the secondary-side SACO circuit N1 through the then released flow section between the supply connection S and the outlet E.

On the tertiary side, a water reservoir B with a water pool 14 having a water level which is denoted by reference symbol 14.0, is disposed at a geodetically higher level than the SACO SK1 and is connected to a tertiary-side intake 15 of the SACO SK1 through a parallel connection of a minimum flow bypass line b1 with a shut-off valve A0 as well as a line branch b11 with a control valve A1, that is connected in parallel with the minimum flow bypass line b1. A level of a water pool 16.1 in a tertiary chamber 16 establishing itself during residual-heat removal operation is denoted by reference symbol 16.0. A discharge line for evaporating tertiary medium, which is connected to the tertiary chamber 16, is denoted by reference symbol b2. The evaporated tertiary medium can be blown out over the roof, with it being possible for there to be provided a non-illustrated steam moisture separator having condensate which may enter the water reservoir B through a non-illustrated return feed line.

During operation of the nuclear reactor installation as intended, the secondary circuit of the SACO SK1, which is synonymous with the SACO circuit N1, and also the tertiary side of the SACO SK1, are to be in readiness, so that they are filled with condensate and demineralized water, respectively. In order to avoid energy losses by the discharge of vapor over the roof, a low circulation in the secondary circuit of the SACO SK1 is also to be avoided, which happens by blocking the swirl chamber valve WV by means of the tangential control stream Qc through the control connection C. The required control stream Qc is produced in power operation or in start-up and shut-down operation of the installation by the main feed-water pump P2 or the non-illustrated start-up and shut-down pumps. As soon as the control stream Qc approaches zero due to failure or deliberate switching off of the pump concerned, the natural circulation in the SACO circuit N1, i.e. the cooling of the steam produced in the steam generator on account of the decay heat in the SACO SK1 and the return of the condensate through the elements d3-WV-d4-5 into the secondary chamber 2 of the steam generator, begins to start up automatically. In order to maintain continuous operation, all that is necessary is to ensure the non-illustrated secondary circuit shut-off (for example live-steam shut-off valve in the live-steam line d1 in the closed position). In order to control the heat removal in dependence on the amount of residual heat produced, there is provided the control valve A1, which is in the open position during normal operation and is controlled according to the requirements of the system. The falling filling level in the water reservoir B has the effect of assisting control.

The volume of this reservoir B must be constructed to be great enough to allow a residual-heat removal operation of preferably at least 24 hours to be maintained.

Figure 2:
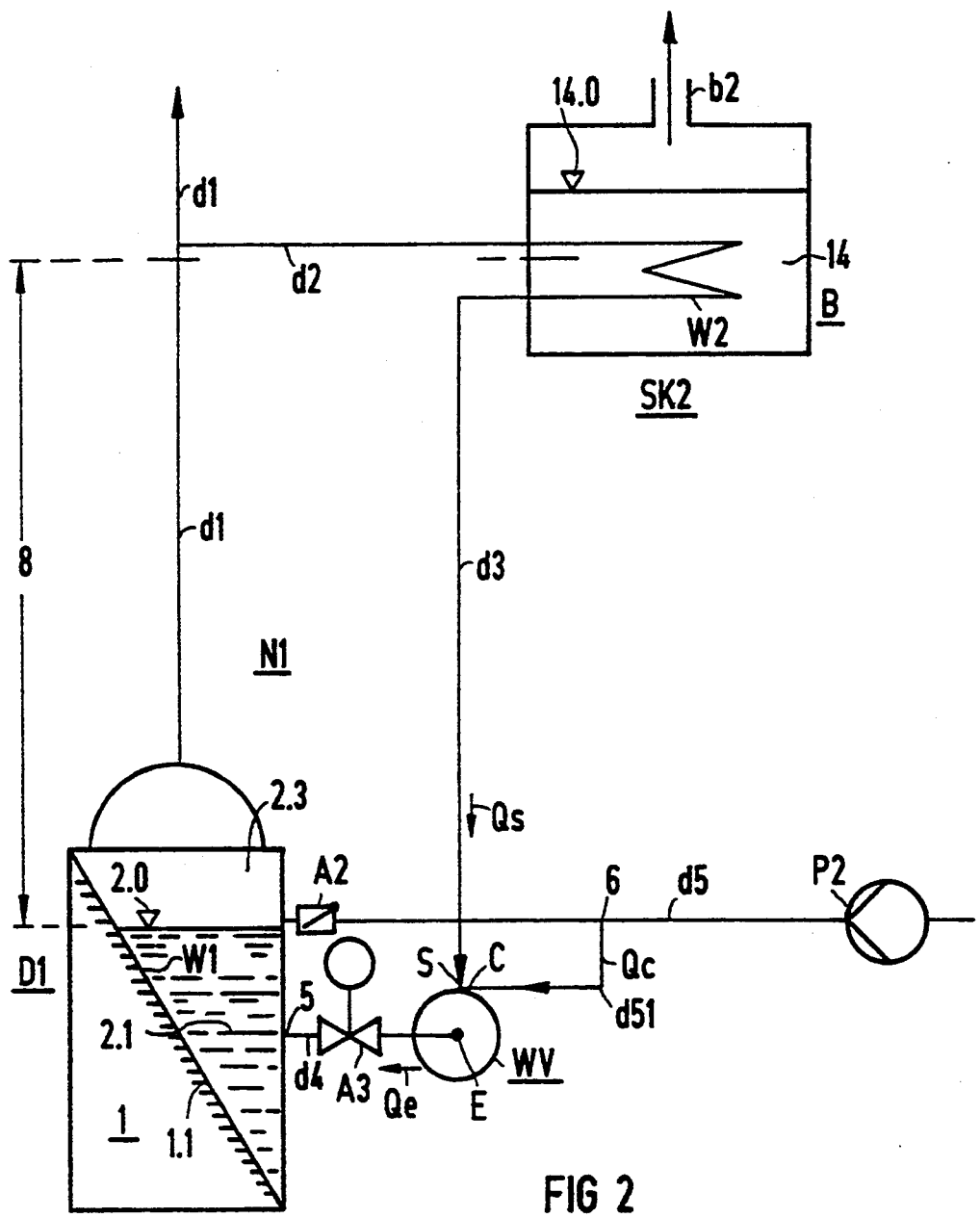
FIG. 2 is a diagrammatic and schematic view showing a second illustrative embodiment of a residual-heat removal system, in which the safety condenser and the water reservoir form one structural unit.

In the case of the second illustrative embodiment according to FIG. 2, a tube bundle W2 of a SACO SK2 is integrated in the water pool 14 of the water reservoir B, so that a combined SACO/water reservoir SK2/B is formed. The water level 14.1 of the water pool 14 is geodetically higher than the tube bundle W2 of the SACO Sk2. The outlet E of the swirl chamber valve WV opens out into the feed-water inflow space, or the secondary chamber 2, of the steam generator D1, through a control valve A3 that is open during normal operation of the steam generator, with it being possible in principle for the control valve also to be connected between the SACO SK2 and the swirl chamber valve WV. In the case of this circuit, control takes place in the condensate return by condensate retention in the tube bundle W2 of the safety condenser SK2. Otherwise, the function of the circuit according to FIG. 2 is analogous to that according to FIG. 1: the flow path S-E of the swirl chamber valve WV is blocked by a control stream Qc at the control connection C as long as the main feed-water pump P2 is in operation. If the secondary-side heat removal is blocked off through the live-steam line d1 to a downstream steam turbine by means of closing the live-steam valve and if the pump P2 is switched off, the natural circulation in the secondary-side SACO circuit N1, and consequently the residual-heat removal operation, commences so that the primary medium flowing through the heat-exchanging tubes W1 can give off its heat to the secondary medium 2.1, with the secondary medium in the SACO SK2, in the form of steam, cooling again and condensing.

We claim:

1. In a pressurized-water nuclear reactor having a primary loop, a secondary-side residual-heat removal system, comprising:

a) a steam generator having a primary side, a secondary side, heat-exchanging tubes on said primary side being connected into the primary loop of the nuclear reactor, a feed-water connection on said secondary side, a main feed-water pump connected to said steam generator;

b) a safety condenser, circuit lines having a cold leg leading from said safety condenser to said feed-water connection of said steam generator, said safety condenser having a secondary side connected to said secondary side of said steam generator by said circuit lines in a secondary circuit and having a tertiary side allowing a throughflow of a tertiary medium for cooling said secondary side of said safety condenser, said safety condenser being disposed at a higher level than said steam generator, defining a difference in level between said safety condenser and said steam generator being dimensioned for achieving a natural circulation in said secondary circuit leading through said secondary side of said steam generator and said safety condenser in a residual-heat removal operation;

c) a vortex chamber valve having a supply connection, an outlet, a control connection and an internal flow path leading from said supply connection to said outlet and into said cold leg of said circuit lines, said control connection shutting off said internal flow path with a secondary-side control pressure to be tapped off in normal operation of said steam generator, but releasing said control path in residual-heat removal operation, when the control pressure drops or disappears, for freely switching on said vortex chamber valve due to a reduced control pressure at said control connection and setting a circulating flow in motion in said secondary circuit through said vortex chamber valve, when said main feed-water pump is switched off; and d) a water reservoir having a water level, whereby said water level being geodetically higher level than said safety condenser for supplying said tertiary side of said safety condenser.

2. The residual-heat removal system according to claim 1, including a minimum flow bypass line connected to said water reservoir, said safety condenser having a tertiary-side intake being connected to said minimum flow bypass line.

3. The residual-heat removal system according to claim 1, wherein said safety condenser has a heat-exchanging tube bundle, and said water reservoir has a water pool surrounding said heat-exchanging tube bundle of said safety condenser.

4. The residual-heat removal system according to claim 1, wherein said safety condenser has a tertiary-side intake, and including a parallel connection connecting said water reservoir to said tertiary-side intake, said parallel connection having one branch with a minimum flow bypass line and a shut-off valve and another branch with a control valve.

5. The residual-heat removal system according to claim 1, including a pressure-side feed-water line part having a downgradient from said main feed-water pump and being connected to said control connection of said vortex chamber valve.

6. The residual-heat removal system according to claim 1, wherein said water reservoir has a water pool, said safety condenser has a heat-exchanging tube bundle disposed in said water pool, forming a combined safety condenser/water reservoir, said steam generator has a secondary chamber, and including a control valve being open in normal operation of said steam generator, said outlet of said vortex chamber valve opening out into said secondary chamber through said control valve.

* * * * *